(12) United States Patent
Parfrey

(10) Patent No.: US 8,679,606 B2
(45) Date of Patent: Mar. 25, 2014

(54) THICK WALLED COMPOSITE TUBULAR AND METHOD OF MAKING

(75) Inventor: Karl A. Parfrey, Houston, TX (US)

(73) Assignee: Vetco Gray Inc., Houston, TX (US)

(*) Notice: Subject to any disclaimer, the term of this patent is extended or adjusted under 35 U.S.C. 154(b) by 489 days.

(21) Appl. No.: 12/904,316

(22) Filed: Oct. 14, 2010

(65) Prior Publication Data

US 2012/0094041 A1    Apr. 19, 2012

(51) Int. Cl.
*B29C 70/08* (2006.01)
*B29D 22/00* (2006.01)

(52) U.S. Cl.
USPC ........ 428/36.3; 428/34.6; 428/35.7; 428/36.1

(58) Field of Classification Search
USPC ................. 156/161, 165, 173; 428/35.7, 34.1
See application file for complete search history.

(56) References Cited

U.S. PATENT DOCUMENTS

| 3,429,758 | A |   | 2/1969 | Young |
|---|---|---|---|---|
| 3,729,028 | A |   | 4/1973 | Horvath et al. |
| 4,732,634 | A |   | 3/1988 | Hill |
| 4,854,988 | A |   | 8/1989 | Voirol |
| 5,143,312 | A | * | 9/1992 | Baurmeister ................. 242/444 |
| 5,557,982 | A | * | 9/1996 | Voss et al. .................... 74/551.1 |

FOREIGN PATENT DOCUMENTS

| FR | 2464423 A1 | 3/1981 |
|---|---|---|
| GB | 1229612 A | 4/1971 |
| GB | 1493140 A | 11/1977 |

OTHER PUBLICATIONS

GB Search Report dated Feb. 13, 2012 from corresponding Application No. GB1117508.0.

* cited by examiner

*Primary Examiner* — Ellen S Raudenbush
(74) *Attorney, Agent, or Firm* — Bracewell & Giuliani LLP

(57) ABSTRACT

A method and apparatus for forming a tubular from a composite material. The composite material includes fibers and epoxy resin that are formed into plies that are wound around an axis to form an annular member. The fibers in each ply are arranged axially and hoopwise. The axially oriented fibers are angled from about 10° up to about 20° with respect to an axis of the tubular. The hoopwise fibers are wound in the plies ranging from about 60° at the innermost ply up to about 90° in the outermost ply. The hoop fibers in the intermediate plies are arranged at increasing angles with distance away from the innermost layer. Transitioning the hoop fiber alignment in the successive plies better distributes hoop stress through the wall of the tubular thereby reducing stress concentrations on the innermost ply.

5 Claims, 3 Drawing Sheets

THICK WALLED COMPOSITE TUBULAR AND METHOD OF MAKING

FIELD OF THE INVENTION

This invention relates in general to a method for forming a composite member. More specifically, the present invention relates to a method for forming a thick walled tubular member from composite constituents. Yet more specifically, the present invention relates to a method for designing the laminate stacking sequence of a thick-walled cylindrical composite pressure vessel to improve the structural performance of the vessel.

DESCRIPTION OF RELATED ART

Tubulars and cylindrical or tubular pressure vessels having thick walls are subject to stresses in their walls that vary as a function of radial position within the wall thickness. An example of how stress is distributed throughout the wall of a thick-walled cylindrical pressure vessel is shown in FIG. 1. Here, the ordinate represents material stress and the abscissa represents radial position within the wall thickness of the pressure vessel. As seen in FIG. 1, the maximum stress in the wall is realized at the inner diameter of the wall and stress drops exponentially when approaching the outer wall, indicating the majority of the stress concentrates within the innermost portion of the wall. As such, thick-walled cylindrical pressure vessels are substantially closer to the failure point of the constituent material along the inner wall than at the outer wall. This results in an inefficient structure as wall thickness is increased to cope with increasing internal pressure. The material in the inner wall region is over-utilized and the material in the outer wall region is under-utilized. Adding additional material to the outer diameter of the pressure vessel increases the weight and cost of the structure while only marginally increasing its ability to contain the internal pressure load. This inefficiency effect becomes quite pronounced as vessel internal pressure loads rise to a significant fraction of typical material strengths, as is the case in modern high-pressure oil and gas equipment.

Pressure vessels or tubulars may be constructed from composite materials by placing a composite of fibers embedded in a matrix material around a cylindrical mandrel. Typically, man-made fibers such as glass, aramid, or carbon fibers are combined with a polymer matrix such as an epoxy resin. After placing the composite of fibers and matrix around the mandrel, the composite is cured and then the resulting tubular structure removed from the mandrel. The composite material may be placed around the cylindrical mandrel using a variety of technologies; such as filament winding, fiber placement, braiding, pultrusion or pull-winding, and roll-wrapping; techniques that have been used to create cylindrical or tubular composite structures.

An example of a prior art filament winding system is shown in a schematic view in FIG. 2. In this example, the filament winding system 10 includes a frame 12 on which a mandrel 14 is horizontally disposed. A creel assembly 28 is shown equipped with a series of spools or bobbins 30 containing filaments 32 that are fed to the mandrel 14. These filaments 32 are typically in the form of a bundle of several thousand collated dry fibers, referred to collectively as a tow. The mandrel 14 is rotated while the creel assembly 28 reciprocates lengthwise on the rail 26 and adjacent the rotating mandrel 14, feeding and wrapping the tows 32 onto the mandrel 14 to create plies or layers of material on the mandrel 14. The tows 32 are combined with the polymer matrix and used to form the composite tubular 24. The tows 32 pass through a resin bath 38 prior to being wound onto the mandrel 14 thereby being impregnated with the matrix material and forming the composite. By controlling the ratio of the rotation speed of the mandrel 14 to the linear reciprocation speed of the creel assembly 28 the tows 32 may be wrapped around the mandrel in a defined helical angle. The filament winding process is capable of producing fiber angles in the range of ±15° to nearly +90° or −90°, as measured relative to the cylindrical mandrel axis. In general a distinction is drawn between helical winding and hoop winding. In a helically wound layer the mandrel rotates while the creel reciprocates back and forth repeatedly, eventually producing a layer with 100% coverage composed of interwoven tows oriented at two complimentary equal-and-opposite ±θ° angles. In a hoop wound layer the mandrel rotates while the creel slowly transverses along the mandrel a single time, producing a single layer circumferentially wrapped at nearly +90° or circumferentially wrapped at nearly −90°, depending upon the creel motion direction.

Other systems for forming composite vessels and tubulars include a fiber placement system, a braiding system, a pultrusion (or pull-winding) system, and a wrapping system. The fiber placement system (not shown) applies fibers pre-impregnated with resin onto a mandrel. Braiding systems employ two or more carriers, each with spools or bobbins, that feed fibers from the spools onto a mandrel while orbiting the mandrel in opposite directions. Pultrusion pulls dry fibers through a heated die where resin is introduced. Pultrusion can be combined with fiber wrapping or braiding systems. Wrapping systems roll a mandrel over a pre-cut sheet of impregnated composite material, where the sheet is generally a collection of fibers that are woven or unidirectional.

Shown in a side schematic view in FIG. 3 is an example of a prior art composite tubular made using one of the prior art techniques shown described above. A series of layers or plies form a laminate construction of the tubular. Each of these individual plies is typically composed of fibers oriented in a single direction, or fibers oriented in two complimentary ±θ positive-and-negative directions as produced by e.g. a filament wound or braided layer. The schedule of fiber angles on a ply-by-play basis is referred to as the laminate stacking sequence, and is typically described in a nomenclature such as $\pm 45°/(88°/-88°/\pm 15°)_{12}/\pm 45°$. This particular example, if applied to a tube fabricated by the filament winding process, would describe a tube comprising first a ±45° helical-wound layer; followed by a series of 12 repeatings of a +88° hoop-wound layer, a −88° hoop-wound layer, and a ±15° helical-wound layer; then finally ending with a ±45° helical wound-layer.

The laminate stacking sequence of a composite structure is typically determined by the anticipated loads to be carried by the structure, as well as by pragmatic concerns relating to manufacturability and durability of the structure. For example, axially aligned fibers would counteract axial loads on a vessel or tubular, and hoop wound fibers would counteract radial loads. However, as described below obstacles prevent truly axial aligned fibers (i.e. ~0°) and truly hoop would fibers (i.e. ~90°).

In an example a tubular structure subject only to axial compression or tension loads would in theory dictate that the fibers are oriented axially along the tube axis at a 0° angle. This would align the reinforcing fibers of the composite material with the direction of the structural loading. This angle however is not achievable by the filament winding method; therefore if tube were to be manufactured by filament winding helical winds at an achievable angle of perhaps ±15° would be used instead. Although the fibers in such a layer are not oriented in a truly axial direction, such a layer would still be referred to as an "axial" layer. Winding a very low helical angle such as ±15° however presents problems. During the filament winding process a substantial tension is maintained in the tows as they are wrapped around the mandrel. This tow tension, combined with the curvature of the tow as it wraps around the mandrel, pulls the tow tightly into the mandrel in the radial direction. This assists with consolidating the layers of the tube, squeezing out excess resin and entrained air bubbles. In addition, the tow tension prevents fiber waviness which reduces structural performance. However, the large effective radius of curvature of the tows as they wrap around the mandrel at a shallow angle of +15° results in a low compaction force and therefore poor laminate quality.

Therefore a real-world design of the axially loaded filament wound tube would also dictate that additional layers be included in the laminate to assist with laminate compaction. Typically hoop-wound layers would be interspersed among the axial layers to compact the axial layers. These hoop-wound layers would also provide some structural durability in the circumferential direction, preventing axial splitting of the tube if it were subjected to a crushing or bending load.

Because when the first layer upon the mandrel is hoop-wound ply, the circumferential fibers roll and gall when the mandrel is pulled out of the tube. Thus, the first ply is often made of a layer at an intermediate angle, such as a +/−45° ply. The final winding on the outside diameter of the tube may also be a ±45° ply to promote impact toughness and durability.

Typically the upper range of fiber angles is at about +/−88°, although less than 90° and not in a true hoop direction, a layer made from fibers applied at these values would still be referred to as a "hoop" layer. In addition, the same considerations of manufacturability and durability as noted above would dictate the inclusion of additional plies with different fiber angles.

Taking into consideration all of these factors a typical filament wound tubular structure may utilize a laminate stacking sequence of the following form: $\pm 45°/(88°_A/-88°_A/\pm 15°_B)_C/\pm 45°$. The numbers A, B, and C are selected to with regard to the particular loading the tubular structure is expected to experience. The ratio of hoop-wound plies to axial plies A:B is dictated by the relative magnitudes of the tubular structure's pressure and axial loadings, respectively. The number of repeatings C of the hoop/axial groups would be dictated by the wall thickness required to withstand the structural loads. Finally, the laminate begins and ends with 45° plies to improve manufacturability and durability.

For the purposes of discussion herein, the above tubular laminate of the form $\pm 45°/(88°_A/-88°_A/\pm 15°_B)_C/\pm 45°$ is referred to hereinafter as the "baseline" laminate. If the baseline design is manufactured by a different methodology not subject to the same fiber angle limitations as the filament winding methodology, the baseline laminate may be generalized to the form $\pm 45°/(HOOP_A/AXIAL_B)_C/\pm 45°$ where HOOP and AXIAL are understood to represent plies or layers of material with fibers oriented in a predominantly or substantially circumferential or axial direction, respectively, as permitted by the constraints of the particular manufacturing methodology.

SUMMARY OF INVENTION

Disclosed herein is an example of a method of forming a composite tubular that includes providing axial filaments and hoop filaments that are combined with a matrix material. In an example embodiment, the method includes forming a first annular ply with axial filaments arranged at an angles of about 10° to about 20° offset from an axis of the tubular. The hoop filaments can be arranged at angles ranging from about 45° to about 65° offset from the axis of the tubular. With each successive ply, the angle the hoop filaments are arranged can be increased and the angle of arrangement of the axial filaments can vary or remain substantially the same.

Also disclosed is an annular laminate having an inner layer, intermediate layers that concentrically circumscribe the inner layer, an outer layer circumscribing the outermost intermediate layer, axial filaments within each layer, hoop filaments within each layer, and a matrix material impregnated within the filaments. The axial filaments are arranged in the inner layer at an angle of about 10° to about 20° with respect to an axis of the tubular, the hoop filaments are arranged in the inner layer at an angle with respect to an axis of the tubular so that when pressure is applied to an inner surface of the tubular and directed radially outward from the axis of the tubular, the hoop stress in the outer layer is at least about 20% of the hoop stress in the inner layer.

Also disclosed is a method of forming a thick walled tubular that includes providing axial filaments and hoop filaments mixed with a matrix material to produce a composite, fashioning the composite into an annular laminate that comprises an inner layer, intermediate layers that concentrically circumscribe the inner layer, an outer layer circumscribing the outermost intermediate, angling the axial filaments in each layer at about 10° to about 20° from an axis of the tubular, angling the hoop filaments in the inner layer at about 60° from the axis of the tubular, angling the hoop filaments in the outer layer at about 90° from the axis of the tubular, and angling the hoop filaments in the intermediate layers from greater than about 60° up to about 90° from the axis of the tubular.

DETAILED DESCRIPTION OF THE INVENTION

Figure 1:
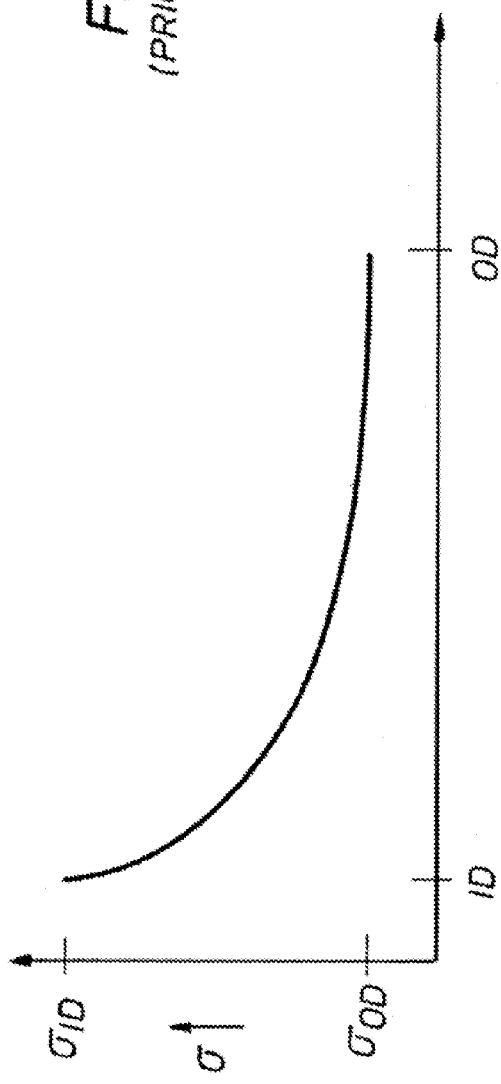
FIG. 1 is an exemplary diagram of hoop stress with relation to wall thickness.
Figure 2:
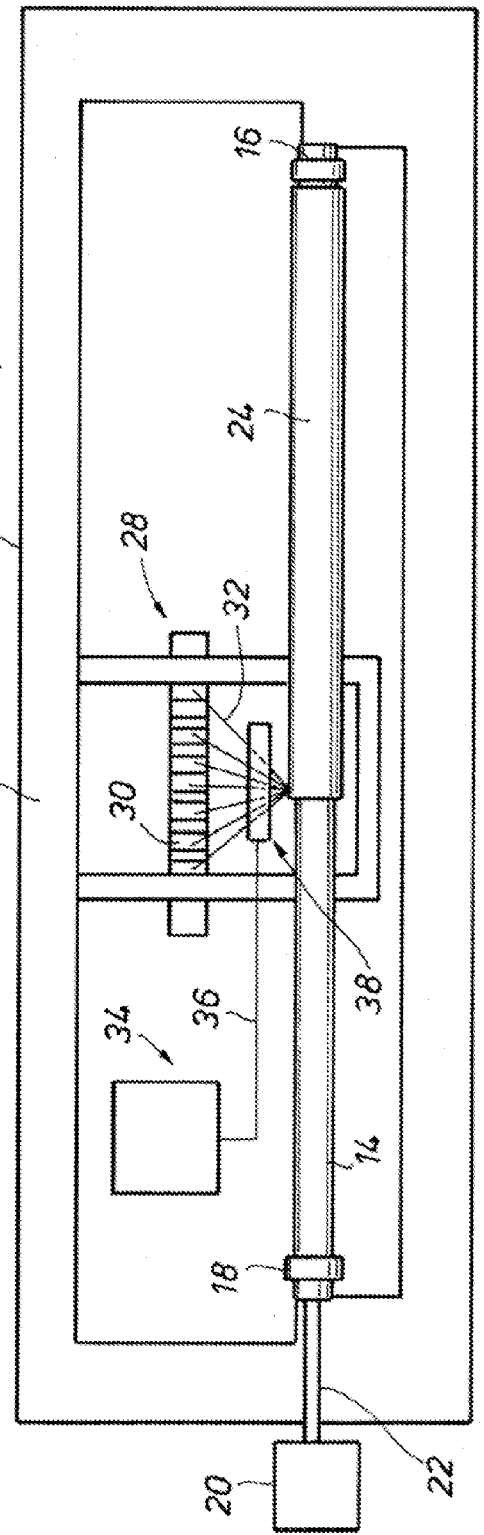
FIG. 2 is a schematic view of a prior an filament winding system.
Figure 3:
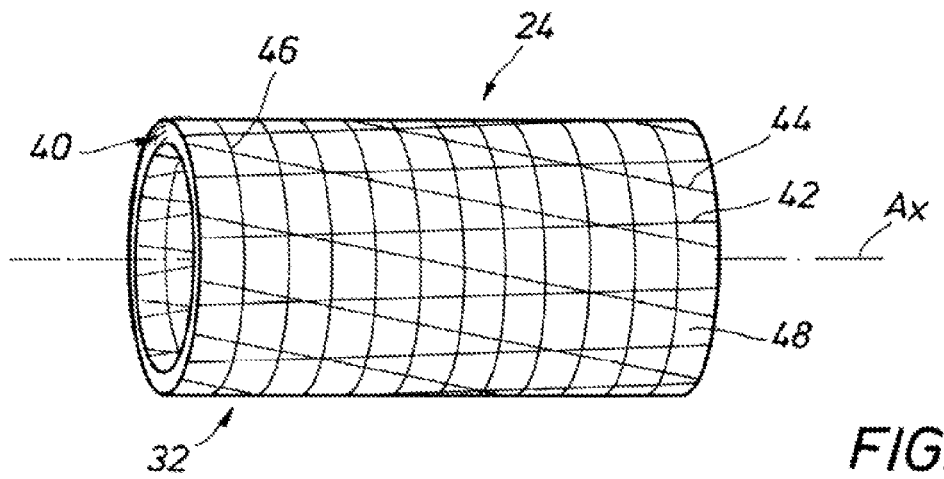
FIG. 3 is a side schematic view of the filaments wound in a prior art composite tubular.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

Figure 4:
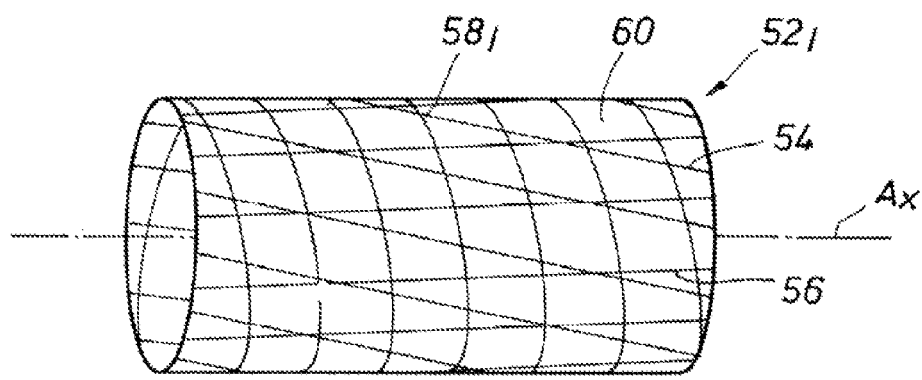
FIG. 4 is an example of an inner ply of a composite tubular in accordance with the present disclosure.

Referring now to FIG. 4, an example of an innermost layer, or first ply 52, is illustrated in a side schematic view. In this example, the first ply 52 circumscribes an axis $A_X$ and is formed from a composite of axial filaments 54, 56, hoop wound filament 58, and a matrix material 60. The axial wound filaments 54, 56 are shown disposed at an angle offset from the axis $A_X$. Example angles range from as low as 0° and up to about +/−20°. Optionally, the angles can range from about +/−10° to about +/−17°, or about +/−15°. The hoop wound filament 58 of FIG. 4 is shown at an angle less than 90°. The angle can vary depending on the application of the final product and is established so that hoop stresses within the wall of a composite tubular are better distributed throughout each of the plies making up the tubular wall. Example angles of the hoop wound filament $58_1$ for the first ply $52_1$ range from +/−30° to +/−80°, optionally, the angles may range from about +/−40° to about +/−70°, alternatively, the angles may range from about +/−50° to about +/−65°, and may include an angle of about +/−45°, +/−50°, +/−55°, +/−60°, as well as +/−65°. Moreover, the upper and lower limits of the previously identified ranges may be interchangeable with other cited ranges and any value within these ranges may be an angle at which the hoop wound filament is arranged.

Figure 5:
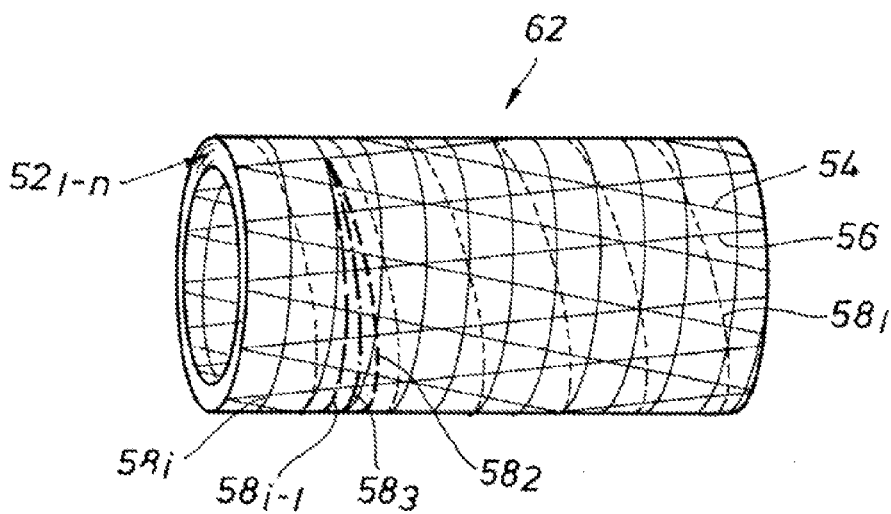
FIG. 5 is a side schematic view of a composite tubular formed with a method disclosed herein.

FIG. 5 shows an example of a composite tubular 62 formed in accordance with the present method. The tubular 62 includes a series of plies $52_{1-n}$ made up of layers of the axially wound filaments 54, 56, the hoop wound filaments $58_{1-i}$, and the matrix material 60. Although a single tow or fiber may make up the hoop wound filaments $58_{1-i}$; for clarity hoop wound filaments within different plies are given different designations. It is also pointed out that the outermost ply has a designation of "n" (i.e. "n" plies), and the hoop wound filaments in the outermost ply $52_n$ have a designation of "i" (i.e. "i" layers of hoop wound filaments), wherein the values for i and n may or may not be equal.

It was discovered that stress distribution through a thick walled composite could be better distributed along the wall by varying the orientation angle of the hoop wound filaments $58_{1-i}$ within the specific plies $52_{1-n}$ or layers that make up the composite tubular 62. Thus, in one example, a composite tubular 62 would have an innermost ply, such as the ply $52_1$ of FIG. 4 with a hoop wound filament $58_1$ at some angle less than 90° to the axis $A_X$ of the tubular and an outermost layer $52_n$ having hoop wound fibers $58_i$ that are substantially normal to the axis $A_X$ of the tubular 62. The intermediate plies $52_2$-$52_{n-1}$ can have hoop wound filaments $58_2$-$58_{i-1}$, arranged at angles whose values range from about the angle of orientation of the hoop wound filament $58_1$ in the innermost ply $52_1$ and the orientation angle of the hoop wound filament 58, in the outermost ply $52_n$. In one example, each successive ply from the inner ply $52_1$ to the outermost ply $52_n$ have hoop wound filaments at angles greater than the adjacent inner ply.

An example of successively increasing angles in the hoop wound filaments $58_1$-$58_n$ is illustrated in FIG. 5. Here, the innermost hoop wound filament $58_1$ is illustrated in a phantom line, as are filaments $58_2$, $58_3$, and $58_{i-1}$. The angle difference of the hoop wound filaments $58_1$-$58_i$ may be constant between successive adjacent plies $52_u$-$52_v$ (where v is greater than u, and u can range from 1 to n−1 and v can range from 2 to n), may transition in incremental steps, or can vary exponentially with respect to thickness of the composite wall. Optionally, the angle difference between the hoop wound filaments $58_1$-$58_i$ between successive adjacent plies $52_x$-$52_y$ can be found from an optimization study performed on an Information Handling System, such as a processor or computer with associated programmable readable medium, and/or be determined iteratively or with an algorithm.

In an example embodiment, a hoop wound filament $58_{1-i}$ may not be included within each ply $52_1$-$52_n$, one or more of the plies $52_1$-$52_n$ may be made of axial windings 54, 56. In yet another alternative, the inner most and outer most plies $52_1$, $52_n$ may have intermediate windings with fiber angles of +/−45°. In yet another example embodiment, the composite tubular 62 may have a laminate stacking sequence of +/−45° $(+/-\theta°_X/+/-AXIAL_Y)_N/+/-45°$. While the values of X, Y, and N can vary depending on the particular application, in this example embodiment the values of θ will increase with increasing values of X. In another example embodiment, the fiber angle of the hoop wound filaments $58_1$-$58_i$ may reach the maximum between the innermost and outermost plies $52_1$, $52_n$ and at about two thirds of the distance from the innermost ply $52_1$. In this example embodiment, the fiber angle remains substantially the same from the two thirds position to the outermost ply $52_n$.

Figure 6:
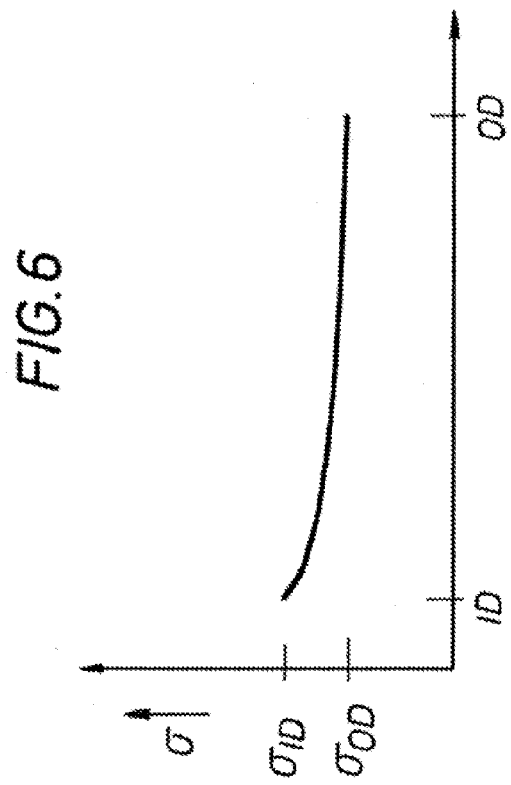
FIG. 6 is a diagram illustrating hoop stress in relation to wall thickness of a composite tubular made in accordance with the present disclosure.

An example of a stress distribution through the wall of a composite tubular is illustrated in graphical form in FIG. 6. In this example, the difference between stress at the inner and outer walls is reduced and higher stress values are experienced along intermediate positions within the wall. This results in a stress distribution plot of FIG. 6 being flatter than the one of FIG. 1, thereby indicating more equal stress distribution between the inner and outer walls of the composite tubular.

Figure 7:
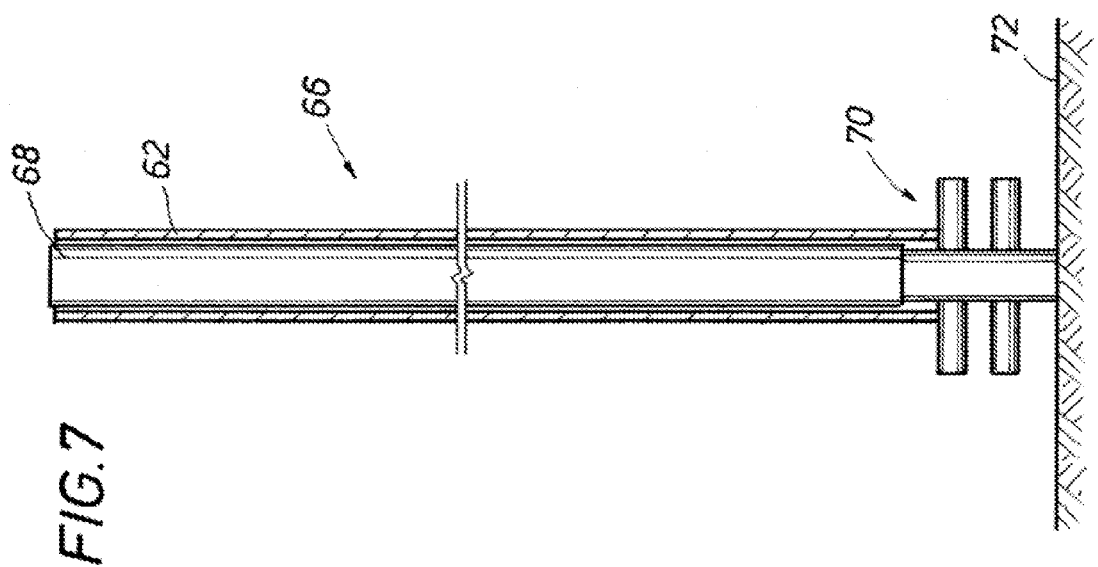
FIG. 7 is a side view of an example of use of a composite tubular formed in accordance with the present disclosure.

In one example of use of a composite tubular 64, a portion of a drilling system 66 is illustrated in FIG. 7 as having a vertical riser 68 mounted into a subsea well assembly 70. Attached to and parallel with the riser 68 are composite tubulars 62 formed from the above-described process. Subsea wellhead assembly 70 is mounted on the subsea floor 72. Advantages are realized by a subsea wellhead assembly 70 employing a composite tubular 62 formed as described herein. For example, the composite tubular 62 may be used in choke and kill lines. Distributing hoop stress throughout the tubular wall can decrease wall thickness, up to about 30%. Since choke and kill lines can outweigh larger diameter risers 86 due to their large wall thickness, lighter stronger lines are available using the composite tubular described herein. Reduced weight lines can increase ease of handling presently designed systems as well as safety. Additionally, the lighter composite tubulars can allow for drilling operations at previously unattainable depths.

Although this disclosure discusses the invention in the context of tubular pressurized fluid conduits used in oil and gas equipment, the present disclosure should not be construed as limited to a particular field of endeavor. The invention disclosed herein relates to pressurized cylindrical or tubular composite structures, which may take the form of open-ended tubular fluid conduits, or the form of closed-ended cylindrical pressure vessels.

The present system and method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A composite tubular comprising:
   an inner layer;
   intermediate layers that concentrically circumscribe the inner layer;
   an outer layer circumscribing the outermost intermediate layer;
   axial filaments within each layer that are arranged in the inner layer at an angle of about 10° to about 20° with respect to an axis of the tubular;
   hoop filaments within each layer that are arranged at an angle with respect to an axis of the tubular that increases with proximity to the outer layer; and
   a matrix material impregnated within the filaments.

2. The composite tubular of claim 1, wherein the hoop filaments in the intermediate layers are arranged with respect to the axis of the tubular at angles ranging from more than the angle at orientation of the hoop filaments in the inner layer and up to about 90°.

3. The composite tubular of claim 1, wherein when pressure is applied to an inner surface of tubular and directed radially outward from the axis of the tubular, the hoop stress in the outer layer is at least about 20% of the hoop stress in the inner layer.

4. The composite tubular of claim 1, wherein the hoop filaments in the inner layer are at an angle of at least about 50° with respect to the axis of the tubular.

5. The composite tubular of claim 1, wherein the hoop filaments in the outer layer are at an angle of about 90° with respect to the axis of the tubular.

* * * * *